US011966629B2

(12) United States Patent
Mane et al.

(10) Patent No.: US 11,966,629 B2
(45) Date of Patent: Apr. 23, 2024

(54) CUSTOM INITIALIZATION IN A DISTRIBUTED DATA STORAGE SYSTEM

(71) Applicant: Seagate Technology LLC, Fremont, CA (US)

(72) Inventors: Hemant Vitthalrao Mane, Pune (IN); Jason Matthew Feist, Minneapolis, MN (US); Praveen Viraraghavan, Chicago, IL (US); Robert W. Dixon, Longmont, CO (US); Marc Timothy Jones, Longmont, CO (US); Steven Williams, Longmont, CO (US)

(73) Assignee: Seagate Technology LLC, Fremont, CA (US)

( * ) Notice: Subject to any disclaimer, the term of this patent is extended or adjusted under 35 U.S.C. 154(b) by 119 days.

(21) Appl. No.: 17/847,509

(22) Filed: Jun. 23, 2022

(65) Prior Publication Data

US 2023/0418506 A1 Dec. 28, 2023

(51) Int. Cl.
*G06F 3/06* (2006.01)

(52) U.S. Cl.
CPC .......... *G06F 3/0655* (2013.01); *G06F 3/0604* (2013.01); *G06F 3/067* (2013.01)

(58) Field of Classification Search
CPC .... G06F 3/0604; G06F 3/0629; G06F 3/0632; G06F 3/0634; G06F 3/0637; G06F 3/0655; G06F 3/067; G06F 12/0646; G06F 13/1694; G06F 15/177

USPC ....... 710/8, 10, 104; 711/154; 713/1, 2, 100; 714/36

See application file for complete search history.

(56) References Cited

U.S. PATENT DOCUMENTS

| | | | |
|---|---|---|---|
| 6,785,746 B1 * | 8/2004 | Mahmoud | G06F 3/0689 710/10 |
| 10,248,791 B2 | 4/2019 | Pappachan et al. | |
| 10,601,593 B2 | 3/2020 | Antonopoulos et al. | |
| 10,673,638 B2 * | 6/2020 | Gulati | G06F 21/572 |
| 2020/0112563 A1 * | 4/2020 | Ree | H04L 9/3247 |
| 2020/0145824 A1 * | 5/2020 | Jones, Jr. | H04B 3/54 |
| 2020/0272744 A1 | 8/2020 | Kaushik et al. | |

* cited by examiner

*Primary Examiner* — Ilwoo Park
(74) *Attorney, Agent, or Firm* — Hall Estill Law Firm

(57) ABSTRACT

A distributed data storage system can be configured with a host connected to a first device and an initialization module that performs a default initialization procedure on the first device in response to detecting the first device has an unknown manufacturing origin. Conducting the default initialization procedure may allow the first device to service data access requests from the host. In response to the connection of a second device to the host and initialization module, a manufacturing origin of the second device is identified with the initialization module before the initialization module customizes the default initialization procedure to a custom procedure that is executed to allow the second device to satisfy a background operation prescribed by the initialization module.

20 Claims, 4 Drawing Sheets

CUSTOM INITIALIZATION IN A DISTRIBUTED DATA STORAGE SYSTEM

SUMMARY

The present disclosure generally has embodiments directed to the optimization of system performance in response to a detected identification of the manufacturing origin of system hardware.

Embodiments of a distributed data storage system connect a host to a first device and an initialization module that performs a default initialization procedure on the first device in response to detecting the first device has an unknown manufacturing origin. Conducting the default initialization procedure allows the first device to service data access requests from the host. In response to the connection of a second device to the host and initialization module, a manufacturing origin of the second device is identified with the initialization module before the initialization module customizes the default initialization procedure to a custom procedure that is executed to allow the second device to satisfy a background operation prescribed by the initialization module.

Other embodiments of a distributed data storage system connect a host to a first device and an initialization module that performs a default initialization procedure on the first device in response to detecting the first device has an unknown manufacturing origin. Conducting the default initialization procedure allows the first device to service data access requests from the host. Connecting a second device to the host and initialization module coincides with the initialization module identifying a manufacturing origin of the second device and transitioning the default initialization procedure to a passive procedure. The second device is utilized to satisfy a first host-generated data access request prior to completing the passive procedure.

These and other features which may characterize various embodiments can be understood in view of the following detailed discussion and the accompanying drawings.

DETAILED DESCRIPTION

A data storage system, in some embodiments, is directed to detecting a manufacturing origin of hardware and customizing the initialization of the hardware into the system to mitigate the risk of initialization degrading system performance over time.

With greater volumes of data being generated, transferred, and accessed by a growing number of users, computing devices are being manufactured by larger numbers of sources. While commonality of hardware manufacturing is not required for compatibility within a distributed data storage system, hardware from dissimilar manufacturers can prolong an initialization process that allows the newly installed hardware to be utilized by the assorted aspects of a distributed data storage system. To date, computing hardware has been initialized with a single, default initialization procedure regardless of the manufacturing origin of the hardware. Such a uniform initialization can assure the compatibility of hardware with other devices of the system, use of a default initialization for hardware with known manufacturing origins can be inefficient as preexisting protocol, software, and/or routines installed during manufacturing can be utilized without initialization.

Hence, assorted embodiments are directed to the intelligent identification of the manufacturing origin of newly installed hardware and leveraging known, or accurately predicted, hardware origin to customize an initialization procedure and minimize the degradation of performance due to optimized utilization of system resources. The ability to effectively skip portions of a default device/hardware due to the existing knowledge of the preloaded protocol, software, security, encryption, compression, and/or mapping allows for reduced redundancy and increased performance consistency for a distributed data storage system as resources are saved. The generation of an initialization strategy that proactively sets custom initializations for different known hardware manufacturing origins further increases the efficiency of new device incorporation into a distributed data storage system.

Figure 1:
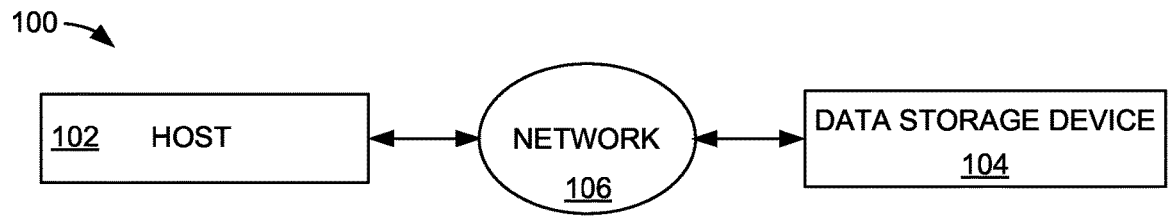
FIG. 1 depicts a block representation of an example data storage system in which various embodiments can be practiced.

FIG. 1 depicts a block representation of an example distributed data storage system 100. While not limiting, the data storage system 100 connects a host 102 to a data storage device 104 via a network 106. A host 102 can be any intelligent node that can generate data access requests that are satisfied by the intelligence of the data storage device 104. It is noted that the network 106 can be any individual, or combination, of wired and/or wireless signal pathways that allow the data storage device 104 to in nearly any physical location on the planet to store data generated by the host 102.

Figure 2:
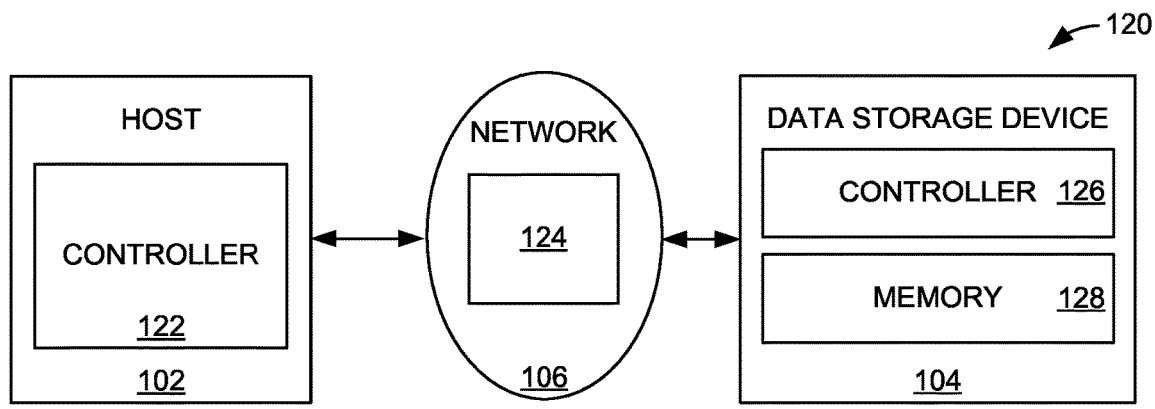
FIG. 2 depicts a block representation of portions of an example data storage system arranged in accordance with some embodiments.

FIG. 2 depicts a block representation of portions of an example distributed data storage system 120 arranged in accordance with various embodiments. A number of hosts 102 can be connected to a number of data storage devices 104 via a network 106 that consists of at least one centralized intelligence that schedules and distributes various data and system activities to selected data storage devices 104 for execution.

Although not required or limiting, the respective hosts 102 can have a controller 122 that generates data and data access requests that are distributed to selected data storage devices 104 by a network controller 124 and subsequently satisfied by a local device controller 126 to a local memory 128. The ability to interconnect and utilize numerous different data storage devices 104 allows increasing numbers of hosts 102 to be serviced concurrently. The use of sophisticated data management protocol, such as NVMe, can further take advantage of the concurrent utilization of assorted data storage devices 104 to provide relatively high data access performance.

However, the flow of data, data access requests, and system tasks through the upstream network components, such as servers, switches, and nodes employing the network controller 124, can experience performance bottlenecks over time. Particularly in high data access request volume conditions employing NVMe protocol, the network components can be overwhelmed and consequently provide reduced data access performance to one or more hosts 102. The addition of assorted memory and data tasks that are necessary to maintain data and memory reliability further exacerbates the performance degradation associated with high volume conditions.

Figure 3:
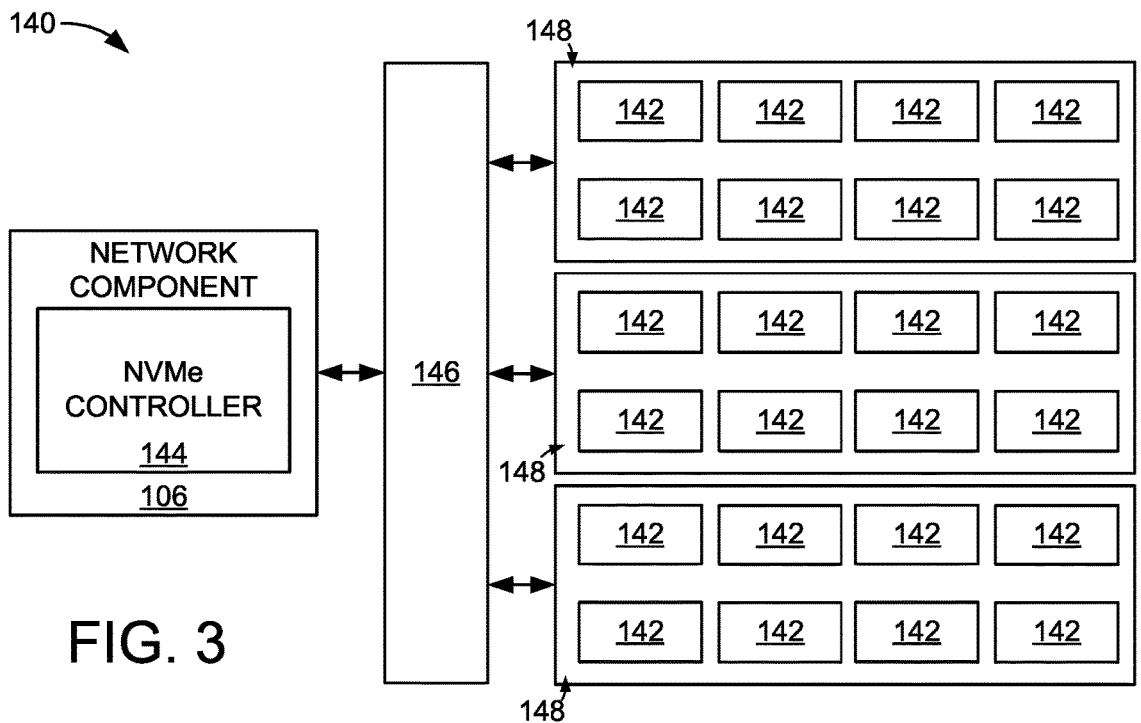
FIG. 3 depicts a block representation of portions of an example data storage system configured and operated in accordance with assorted embodiments.

FIG. 3 depicts a block representation of portions of another example distributed data storage system 140 configured in accordance with some embodiments to employ an NVMe protocol to satisfy host-generated data access requests to, and from, various solid-state memories 142 resident in one or more data storage devices 104. The system 140 has an NVMe controller 144 that arranges a number of data queues 146 and namespaces 148 to accommodate the data handling capabilities of the NVMe protocol.

Generally, NVMe is a communications interface and driver that defines a command set and feature set for PCIe-based solid-state drives (SSDs) with the goals of increased and efficient performance and interoperability on a broad range of enterprise and client systems. NVMe was designed for SSD as a layer between the device driver and the PCIe device, standardizing the rules with emphasis on scalability, low latency, and security. NVMe communicates between the storage interface and the System CPU using high-speed PCIe sockets, independent of storage form factor. Input/Output tasks performed using NVMe drivers begin faster, transfer more data, and finish faster than older storage models using older drivers, such as serial ATA (SATA) SSDs. Because it was designed specifically for SSDs, NVMe is becoming the new industry standard for both servers in the data centers and in client devices like laptop, desktop PCs and even next gen gaming consoles.

The standard developed to allow modern SSDs to operate at speeds flash memory is capable of, a sharp advantage with faster read-write. The NVMe SSD enables the flash memory to run directly through the PCI Express (PCIe) serial bus interface as it offers high bandwidth due to being directly attached to the CPU rather than function through the limiting SATA speeds. As SSDs superseded the slower HDDs as primary storage, a fast interface was required to achieve optimal use of the quicker speed capabilities.

That is, NVMe is a technological depiction of the bus, the memory component (SSD) uses to communicate with the computer, and not exactly a new type of memory. A communications interface and driver that outlines a command set and feature set of PCIe based SSD. NVMe technology is available in a number of form factors such as the PCIe card slot, M.2, and U.2, but with all form factors, it directly connects electrically to the motherboard via the PCIe rather than SATA connection.

NVMe, in some configurations, can support multiple I/O queues, up to 64K with each queue having 64K entries. Legacy SAS and SATA can only support single queues and each can have 254 & 32 entries respectively. The NVMe host software can create queues, up to the maximum allowed by the NVMe controller, as per system configuration and expected workload. NVMe supports scatter/gather IOs, minimizing CPU overhead on data transfers, and even provides the capability of changing their priority based on workload requirements. The interface is designed for high scalability and NVM independence to enable next-generation technologies to deliver sustained 4 KB of random accesses over 1 million I/Os per second, which translates to 1 μs or less per command.

NVMe doesn't need the intervening host bus adapter (HBA) and can connect to a higher number of PCIe lanes. A SAS lane runs at 12 Gb per second, which contracts to just about 1 GB per second after overheads. As well, a SATA lane drops performance to half of that, while while a Gen5 PCIe lane runs at 32 Gb per second, or approximately 15.75 GB/s, for four lanes with overhead. Since a SATA SSD runs at 0.5 GB/s, and a typical NVMe PCIe Gen5 SSD is configured to use 4 lanes, an NVMe SSD can achieve nearly 32 times higher throughput than the SATA SSD.

It is noted that NVMe is not affected by the ATA interface constrictions as it sits right on the top of the PCI Express directly connected to the CPU. That results in four times faster Input/Output Operations Per Second (IOPs) rivaling the fastest SAS option available. NVMe can deliver sustained read-write speed of 2000 MB per second. NVMe enables drives to benefit from the same "pool" of lanes that directly connect to the CPU, which offers scalable performance by going beyond the conventional four lanes found in most PCIe SSDs and utilize them for added performance. PCIe sockets transfer more than 25 times more data than their SATA equivalent.

However, NVMe storage can have performance issues that result in added cost and inconvenience. For instance, traditional storage controllers, such as flash or HDD controllers, can only handle low levels of I/O processing and create latency and cap performance of NVMe systems. Additionally, the sheer number of possible concurrent commands being processed simultaneously risks inefficiency, complexity, excess power consumption, and unwanted processing. Hence, simplification and system optimization that allows for efficient and adaptable NVMe operation can enhance the capabilities and performance of SSDs both alone and in pooled data center environments.

With the capabilities of NVMe, it can be appreciated that the concurrent use of multiple lanes can provide increased performance while suffering from added complexity that jeopardizes the security and reliability of data, at times. As an example, intelligent operation of queues 146 that temporarily hold data before storage into selected logical namespaces 148 can provide maximum operational performance, during some volumes of host-generated data access requests, but have operational bottlenecks that slow data access, delay data rebuilding, and/or delay security operations on data and/or memory during heightened volumes of requests.

Such request dependent performance can be exacerbated by system tasks that function to maintain the reliability of memory and data stored in the memory. That is, the generation, scheduling, distribution, and satisfaction of system tasks, such as security, redundant array of independent disks (RAID), error correction code, firmware, device initialization, data mapping, and metadata operations, can complicate upstream network and/or NVMe controllers 144 to produce one or more performance bottlenecks that slow, delay, and/or cancel completion of system tasks and/or host-generated data access requests.

While the identification of performance bottlenecks can allow for intelligent diversion of system tasks downstream to selected data storage devices for execution, the processing of system tasks downstream can fail to mitigate a bottleneck, particularly during high data access request volume conditions. Hence, assorted embodiments are directed to taking advantage of the configuration of various system 140 components to optimize operational efficiency and mitigate the impact of performance bottlenecks over time.

Accordingly, embodiments are directed to identifying the origin of system components and altering operational parameters to components with known, trusted origins to maintain at least system performance, such as latency, error rate, and overall time to completion, for host-generated data access requests, which provides seamless system operation despite dynamic volumes of activity involving data and/or system memory 142. In other words, the assorted issues associated with NVMe network traffic complexity and inefficiency has prompted the reconfiguration of hardware that has a known, trusted origin to prevent performance bottlenecks and maintain system performance despite relatively high volumes of system activity.

Figure 4:
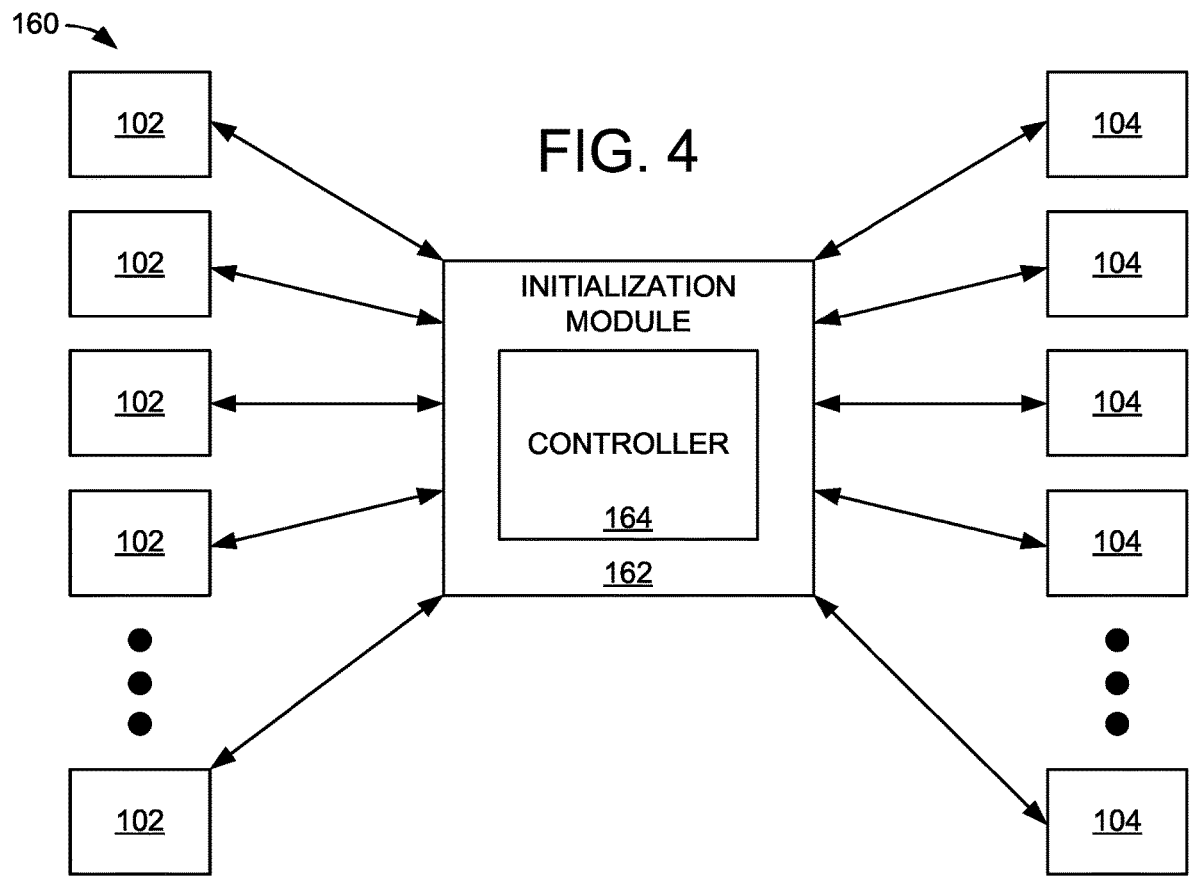
FIG. 4 depicts a block representation of portions of an example data storage system utilized in accordance with various embodiments.

FIG. 4 depicts a block representation of portions of an example distributed data storage system 160 utilized in accordance with various embodiments. Connection of an initialization module 162 to at least one host 102 and at least one data storage device 104 allows for recognition of the origin of the data storage device 104. That is, a controller 164 of the initialization module 162 can passively and/or actively identify an origin of a connected device, such as a manufacturer of the device prior to release to an end-user or an original version of firmware operating on the device. It is contemplated that a device's origin corresponds to the manufacturer of some device hardware, such as the controller, memory, bus, port, lane, channel, motherboard, or system-on-chip (SoC).

The connection of familiar data storage components, such as data storage devices, network controllers, and network nodes allows for the use of trusted data and/or processing channels/lanes. Such dedicated aspects can be employed, in some embodiments, for selected system tasks, such as cryptographic operations, error correction code assignment, error correction code utilization for data rebuilding, RAID operations, firmware upgrades, security operations, and device initializations. The dedication of a channel/lane for a selected tasks and operations can enhance security as well as increase operational efficiency as complex operations can be conducted exclusively. The ability to dedicate a channel/lane for selected tasks further allows NVMe protocol to be employed without jeopardizing data or memory security or process flow.

Recognition of a device's manufacturing origin, in other embodiments, allows hardware to utilized for a variety of purposes that are unavailable, or ill-advised, when the hardware as an unknown, untrusted origin. For instance, supplemental controllers, cache, switches, and/or connections can be activated and utilized without concern for incompatibility, firmware alterations, or security mismatches. It is contemplated that hardware from known manufacturing origins can be dynamically assigned functions and tasks by the initialization module 162 in response to changing operational conditions. The use of NVMe protocol for known origin components, such as an NVMe switch, can provide enhanced capabilities and/or performance that would otherwise not be capable with non-trusted components with unknown origins and/or operational configurations.

Through the passive recognition of hardware manufacturing origin, component initializations and security protocol can be streamlined. That is, a trusted, known origin component allows some, or all, of a component's initialization to be skipped, ignored, or abbreviated. Knowing that a component is trusted and/or has a common operating/security/communication protocol allows the component to be utilized more efficiently than if normal component initializations were conducted. The initialization-less component connection can be employed for dedicated NVMe operation that is unimpeded by initializing the component into the system, building a security profile, and loading firmware.

Other embodiments enabled by the recognition of trusted component with a known manufacturing origin involve sharing data storage functionality that would, otherwise, require re-initializing a non-trusted component to have matching operational and security protocol. Particular embodiments can be directed to shared RAID configurations/functions, error correction, security authentication, drivers, processing, or caching. Sharing functionality among components with known origins can be specifically optimal in distributed systems that employ data storage devices from different brands. For example, known origin components can identify one another and establish optimized functionality independent, and potentially autonomously, of unknown component origins, such as NVMe data access request execution, queue management, garbage collection, or metadata protocol.

The intelligence and efficiency provided by the circuitry of the initialization module 162 allows for both passive and active evaluation of a system component 104 to identify and/or predict the component's origin. For instance, the initialization module 162 can passively monitor activity of a component 104 to predict and/or detect what manufacturer released the component 104, what firmware was initially installed on the component 104, and what hardware is present in the component 104, which can be generally characterized as the manufacturing "origin" of the component 104. It is noted that "passive" evaluation of a component 104 is not limited to a particular procedure or timing, but can consist of evaluating operational parameters while the component 104 operates to complete other system tasks and/or host-generated data access requests. Conversely, "active" evaluation of a component 104 can consist of testing of the component 104 with test patterns of data and/or signals generated by the initialization module 162 to identify operational parameters and configurations that indicate the origin of the component 104.

Figure 5:
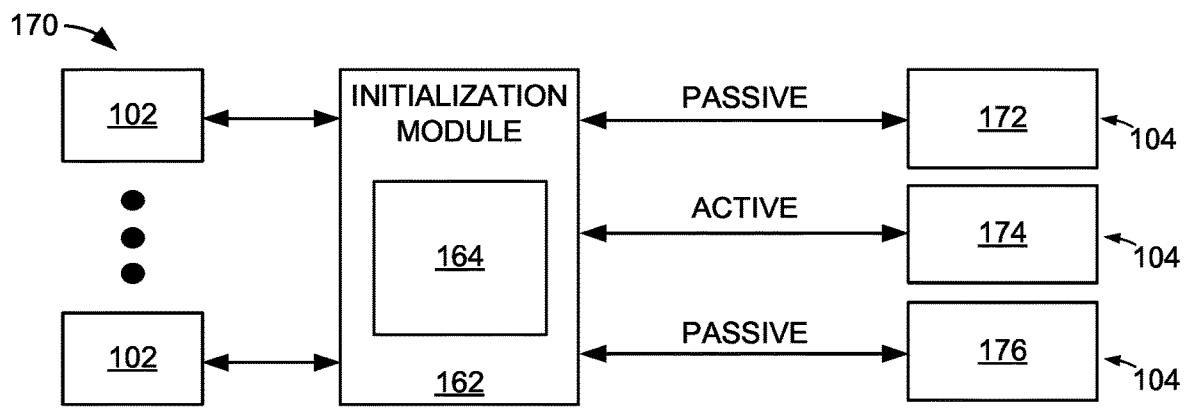
FIG. 5 depicts a block representation of portions of an example data storage system operated in accordance with some embodiments.

FIG. 5 depicts a block representation of portions of an example distributed data storage system 170 that utilizes an initialization module 162 to evaluate and identify the origin of connected hardware. The system 170 can have any number of hosts 102 connected to any number of data storage devices 104 through one or more network components as well as circuitry of the initialization module 162. The devices 104 can have similar, or dissimilar, configurations, such as memory type, capacity, speed, reliability, and origin.

In the non-limiting example of FIG. 5, a first data storage device 172 has previously been connected and utilized by the system 170 without having a manufacturing origin evaluation. Meanwhile, a new data storage device 174 is connected to the system and a third data storage device 176 has had less than all of its hardware identified by manufacturing origin. The initialization module 162 can intelligently determine how and when the various unidentified hardware of the system 170 are identified. It is noted that the data storage system 170 can operate for any amount of time with unidentified constituent hardware.

In accordance with various embodiments, the initialization module 162 can decide if hardware origin evaluation is to be conducted and, if so, will such evaluation be passive or active. A passive origin identification involves monitoring hardware activity over time during the execution of commands, requests, and tasks not specifically directed to origin identification. That is, passive origin evaluation does not generate any specific commands or requests to determine hardware origin and, instead, monitors satisfaction of general device 104 activity for operational parameters that indicate hardware origin. For instance, passive identification can monitor one or more operational metrics, such as power consumption, latency, overall time to completion, and maximum speed, along with operational configurations, such as generated error correction code, parity, metadata, and encryption, to determine what manufacturer created the hardware.

The correlation of passively attained operational activity of hardware can accurately identify what manufacturer created the hardware due to understood manufacturer behavior and/or performance that is unique. For example, evaluation of the latency of assorted data access requests to a memory can indicate the manufacturer (origin) of the memory, a device bus, or signal channel. It is contemplated that multiple different aspects of hardware operation can be utilized to identify the origin of hardware. Some embodiments initially predict the origin of hardware and subsequently discover operational activity that confirms, or negates, the predicted origin.

The passive identification of the manufacturing origin of hardware can be less processing intensive than active origin testing, but can take greater time as the initialization module 162 may wait for commands and/or requests to provide information that can be used to identify hardware origin. In contrast, active origin identification can be faster, and potentially more accurate than passive identification, but at the cost of greater processing burden on the system 170. That is, active hardware origin identification involves a unique testing procedure where operational aspects of hardware are evaluated independently from commands, requests, and tasks generated by other aspects of the system 170. Active origin identification can generate data, commands, and signals to sequentially, or redundantly, poll the operational performance and/or capabilities of hardware, which indicates which manufacturer released the hardware for end-user use.

The non-limiting example of FIG. 5 illustrates how the initialization module 162 can conduct different origin identification protocol for different aspects of a data storage system 170. The intelligent evaluation of available system 170 capabilities with respect to pending data access requests, system tasks, and logged device 104 behaviors allows the initialization module 162 to select an origin identification protocol that operates without degrading average data access performance over time, which provides a seamless origin identification to a connected host 102. In other words, the initialization module 162 can choose and adapt how hardware origin is identified to ensure average data access performance, such as latency and time to completion, does not decrease while hardware is evaluated. The ability to adapt to different protocol in response to changing conditions further enables the initialization module 162 to intelligently recognize the origin of hardware and optimize the connection of known, trusted devices.

Through the recognition of hardware manufacturing origin, the initialization module 162 can identify opportunities for operational optimizations that take advantage of known aspects of hardware from trusted manufacturers. The intelligent use of active or passive hardware origin identification without degrading system performance begins system optimization that leverages known aspects of hardware origin to increase capabilities and performance over time. One such optimization can be the diversion of system tasks to hardware with known origins that can satisfy both assigned tasks and host-generated data access requests without degrading average system performance.

Figure 6:
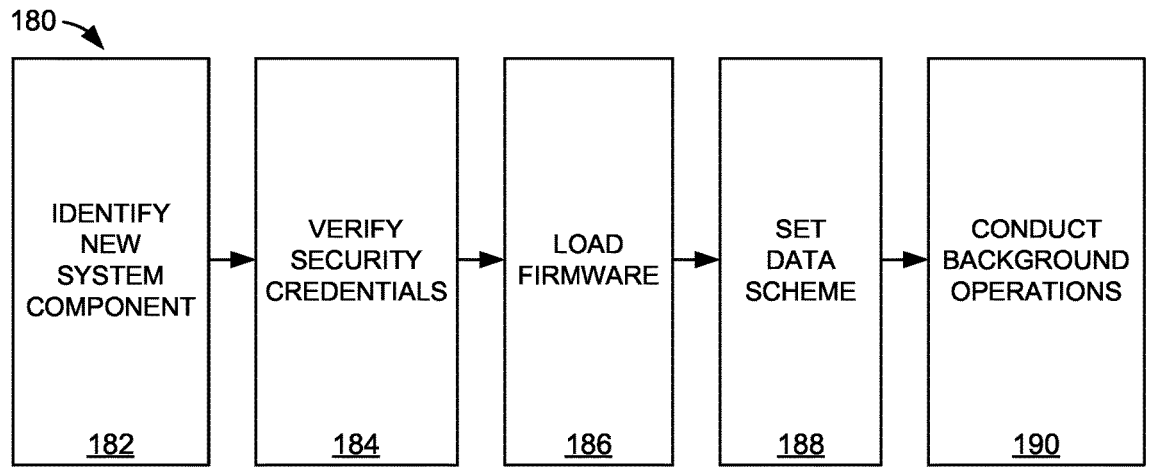
FIG. 6 depicts a block representation of a timeline corresponding with an example initialization procedure conducted in a data storage system.

In assorted embodiments of a distributed data storage system, such as systems 160 and 170 of FIGS. 4 & 5, a newly installed computing component can be brought into service with other, existing components of the system with the example initialization procedure 180 shown in FIG. 6. It is noted that a data storage system can utilize different initialization steps for different types of components, such as memory, processors, servers, switches, and buffers. However, various embodiments employ the single, default setup procedure 180 for newly connected/installed data storage devices regardless of the detected or predicted manufacturing origin of the device. The procedure 180 begins with the identification of a new connection in step 182. Such identification can involve detection of a new signal pathway, source, and/or destination.

It is noted that the default initialization procedure 180 is agnostic with regard to manufacturing origin of the newly connected device and proceeds to verify security credentials of the device in step 184. The security verification can involve any number of steps, such as password, certificate, or key confirmation, that confirm the newly connected device is not an unwanted third-party attack on the distributed data storage system. It is contemplated that step 184 involves the loading of security information to the newly connected device that allows the device to maintain secure status over time.

With the security credentials of the newly connected device verified, the most current version of firmware is loaded to the device in step 186. It is noted that step 186 may involve uploading less than all of a complete firmware package, such as with merely installing a firmware upgrade and/or new version. The proper device firmware allows the device to participate in the configuration of data, in step 188, to conform to the protocol and standards of the distributed data storage system. The data configuration set in step 188 is not limited and can involve, for example, map, metadata, overprovisioning, RAID, buffer, and garbage collection unit arrangements. The function of step 188 can create, delete, move, and copy data into one or more memories, buffers, and queues to conform the configuration of data to system standards and/or protocol, such as addressing, location, and constituent information, like error correction code or metadata.

Before a data storage device, or other newly installed system component, can be freely utilized by other aspects of a distributed data storage system, assorted background operations are scheduled and/or conducted on portions of the newly installed device in step 190. For instance, data addresses can be mapped, rearranged, reassigned, or purged for old data in step 190 as part of one or more background operations. The scheduling, or execution, of one or more background operations can be conducted in step 190 can finalize the data scheme configuration of step 188 and provide uniformity for various system aspects, such as data logical addressing, physical addressing, RAID arrangement, metadata, mapping, or namespace assignment, which allows the newly installed device to be utilized by other aspects of the distributed data storage system without altering or translating data, data commands, or data accesses to provide compatibility.

Figure 7:
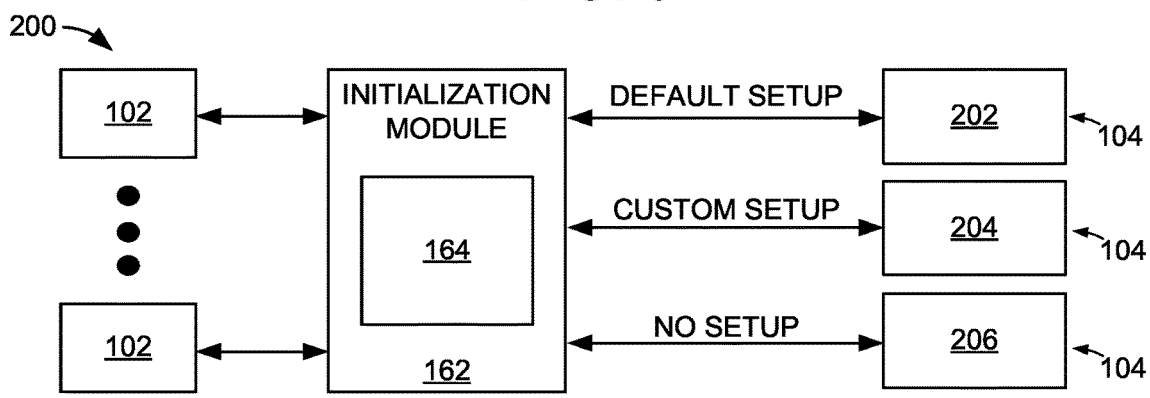
FIG. 7 depicts a block representation of portions of an example data storage system employed in accordance with assorted embodiments.

FIG. 7 depicts a block representation of portions of an example distributed data storage system 200 that employs an initialization module 162 to intelligently generate and execute component initializations in accordance with assorted embodiments. It is noted that FIG. 7 conveys multiple different components 202/204/206 that are respectively newly installed into the system 200 without servicing host-generated data access commands. The respective components 202/204/206 may be similar type of components, such as data storage devices, servers, switches, or nodes, with matching, or dissimilar, capabilities.

In the non-limiting example system 200, the first newly installed component 202 has an unknown manufacturing origin while a second component 204 has a predicted hardware origin and a third component 206 has a known, trusted hardware origin. It is contemplated that the initialization module 162 generates and/or executes one or more tests to a newly connected component 202/204/206 to actively determine the manufacturing origin of the respective hardware. Other embodiments of the initialization module 162 perform passive hardware manufacturing origin evaluation.

In the event the initialization module 162 cannot determine the manufacturing origin of a component, or if a previously unknown manufacturing origin is discovered, the module 162 conducts a default initialization procedure, such as procedure 180 of FIG. 6, prescribed by an initialization strategy. Such default initialization procedure can load and/or process a variety of aspects of the first component 202, even if the module 162 identifies that the initialization will conduct redundant operations, such as security, compression, namespace, garbage collection unit, and RAID configurations. For instance, a component 202 with an unknown manufacturing origin may be identified with loaded characteristics, such as compression or buffering schemes, that match the default initialization procedure, but the initialization procedure knowingly reloads redundant characteristics.

A predicted manufacturing origin of the second component 204 as a result of active, or passive, component evaluation provides knowledge of the operating parameters, performance capabilities, and loaded protocol within the component 204. While a predicted manufacturing origin, and correlating operating/performance capabilities, may be incorrect, the initialization module 162 can detect a wrong prediction through the loading of a customized initialization procedure. As such, the initialization module 162 can conduct an initialization procedure for the second component 204 that is altered from a default procedure, as directed by a predetermined initialization strategy, to customize the steps and/or operations performed to allow the component 204 to be employed to service at least host-generated data access requests.

The customization of an initialization procedure by the initialization module 162 is not limited to a particular alteration of the default procedure, but can involve changing, skipping, or moving an initialization step/process/operation. For instance, the initialization module 162 can alter an operation by requiring less security verification or different logical memory allocation than a default procedure. Other non-limiting examples of a custom initialization procedure can involve moving an operation, such as security verification or data mapping, to the beginning, or end, of an initialization procedure to more efficiently utilize available system/component processing availability. That is, the initialization module 162 can customize the order, operations, timing, and execution of a default initialization procedure in relation to current, or predicted future, system 200 and/or component 204 capabilities and performance.

The identification of a known, trusted manufacturing origin for the third device 206 from tested and/or logged device 206 activity, performance, and protocols prompts the initialization module 162 to immediately service host-generated data access requests by transitioning any initialization steps/operations to passive execution. That is, the initialization module 162 responds to detection of a device with known manufacturing origin by immediately sending requests for satisfaction by the device 206 while delaying execution of any initialization steps until a later time, which can be characterized as passive initialization. In other words, the initialization module 162 waits to perform any initialization steps/operation until a later time to allow the capabilities and protocol installed by the manufacturer to immediately service host-generated data access requests, such as data writes, data reads, and data moves.

It is contemplated that the servicing of data access requests can coincide with the execution of one or more initialization steps/operations. The ability of the initialization module 162 to determine how, and when, to perform initialization steps/operations allows for data access request performance that is customized for maximum speed, minimum latency, and/or maximum satisfaction consistency. For instance, the initialization module 162 can choose what steps/operations of an initialization procedure to execute along with when to execute the steps/operation to provide a customize amount of processing, memory, and/or buffer capabilities to satisfy host-generated data access requests with selected performance.

Through assorted embodiments of the initialization module 162, the known capabilities and pre-installed protocol of a known manufacturing origin are utilized to determine if steps/operations of an initialization procedure are not needed, either due to redundancy or superfluous activity. Initialization steps/operations that are deemed not need by the initialization module 162 results in one or more steps/operations being skipped. For example, all but one initialization step/operation of a default procedure may be carried out passively after host-generated data access requests are completed, which can increase the ability of the system 200 to satisfy host-generated requests with selected performance. It is noted that the reaction to a known, or predicted, device manufacturing origin can be proactively prescribed in one or more initialization strategies that allow for efficient reaction to the detection, or prediction, of the manufacturing origin for a device.

Figure 8:
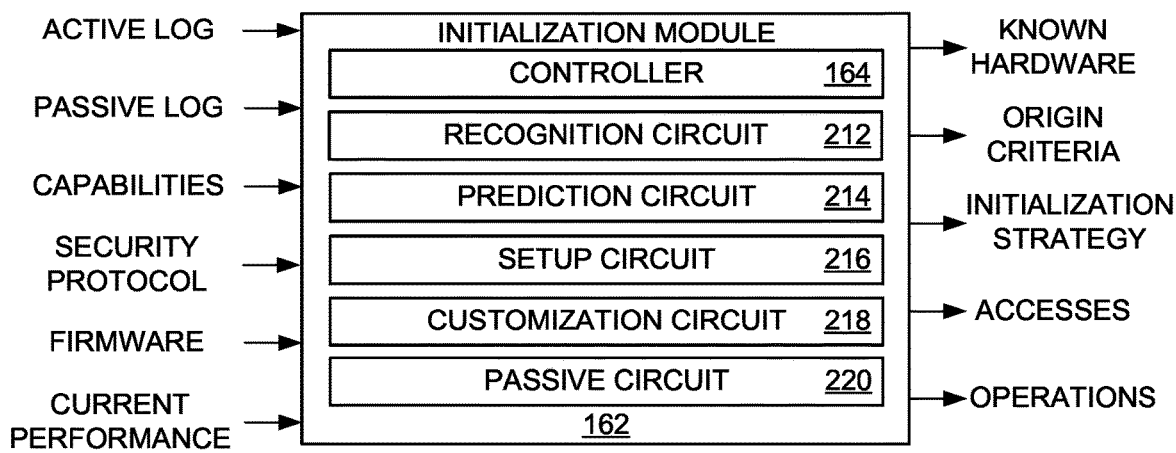
FIG. 8 depicts a block representation of an example initialization module that may be employed in a distributed data storage system in some embodiments.

The intelligent identification, or prediction, of the manufacturing origin of aspects of a newly connected component in combination with the intelligent customization of an initialization procedure can maintain optimal system performance and/or consistency despite incorporating the new component(s) into the system 200. FIG. 8 depicts a block representation of an example initialization module 162 that can be employed in a distributed data storage system in accordance with various embodiments. The module 162 can be configured as hardware resident in any aspect of a data storage system. As an example, the module 162 can be circuitry of a printed circuit board located alone and connected to assorted components of a system or positioned within a component of the system, such as a host 102, network component 106, or data storage device 104.

An initialization module 162, in some embodiments, has a local controller 164 that processes input information, such as logged system activity, pending requests, system configurations, and component capabilities, to generate an optimization strategy that utilizes strategically selected aspects of the system to take advantage of known, trusted components to provide consistent and reliable data access performance over time. The module controller 164 can operate alone, or in conjunction with a recognition circuit 212 to passively, or actively, evaluate the operating parameters of a system component to determine an origin of the component.

Various embodiments of the recognition circuit 212 translate various input information about system data, hardware, configuration, operation, and performance to select between active and passive identification of the origin of system components. That is, the recognition circuit 212 can proactively generate tests and/or procedures to either passively identify a component's origin by evaluating selected operating characteristics, such as latency, input/output per second, average completion time, assigned error correction, and security protocol, or conduct at least one pattern of test signals/data generated by the recognition circuit 212 to actively determine the manufacturer and/or original firmware of the component. The ability to intelligently select between active identification and passive identification allows the initialization module 162 to balance time for identification of origin with amount of system processing resources utilized during identification.

It is noted that passive identification of a component's manufacturing origin can involve the correlation of predetermined criteria generated by the initialization module 162 with operational characteristics and/or performance passively attained while the component is carrying out data access requests and system tasks. The predetermined criteria, in some embodiments, consists of operational characteristics that correspond with a component's origin, such as assigned metadata, mapping, error correction code, or encryption. As such, the initialization module 162, and recognition circuit 212, can maintain the criteria over time to ensure the accurate and efficient identification of a component's origin, which enables the initialization module 162 to optimize the utilization of dormant and/or throttled aspects of the system to take advantage of the known, trusted operating characteristics of the component.

While assorted embodiments select to actively, or passively, identify a component's origin, the initialization module 162 may, alternatively, translate system information into a forecasted component origin. For instance, the initialization module 162 may utilize a prediction circuit 214 to translate collected operational information into a predicted component origin, which provides a less accurate origin determination than active or passive origin identification, but with less processing requirements. The prediction circuit 214 can employ logged system data, model data from other data storage systems, and theoretical operational data to predict what operational activity of a system component indicates the component's origin, such as NVMe namespace assignment, caching scheme, security protocol, metadata assignment, or data encryption.

The use of the prediction circuit 214, in various embodiments, forecasts test patterns of data and/or system signals to increase the efficiency and/or accuracy of active component origin identification. It is contemplated that the prediction circuit 214 forecasts which hardware to throttle or deactivate into a dormant state without degrading average system performance over time, such as time to complete a data access request, error rate, or access latency. The ability of the initialization module 162 to adapt which hardware aspects of a system are dormant or throttled, from collected or predicted system activity, allows for efficient system dynamics that provide optimized utilization of connections with known, trusted components.

Although not required or limiting, known component manufacturing origins can be utilized by the initialization module 162 to generate one or more initialization strategies that proactively assign initialization steps, operations, and timing for various known manufacturing origins. For instance, the initialization module 162 can identify a brand of a newly connected component and correlate the brand to installed protocol as well as operating parameters and performance capabilities in an initialization that allow the setup circuit 216 to generate an initialization strategy that prescribes customization actions, such as skipping, making passive, or altering initialization steps/operations, to avoid redundant and/or superfluous initialization activity due to the preexisting aspects of the component.

The setup circuit 216, in some embodiments, can correlate different initialization customizations to different connected components. As a non-limiting example, the setup circuit 216 can populate one or more initialization strategies with customizations, such as reordering, altering, or skipping aspects of a default initialization procedure, for different types of components, such as memories, servers, switches, processors, or routers, along with different manufacturing origins, such as brand or source of firmware. The setup circuit 216, in other embodiments, can populate an initialization strategy with one or more monitored operating parameter to verify the predicted, or expected, configuration of a component being initialized. Such verification can assure that the customization prescribed by an initialization strategy are optimized to the capabilities, performance, and protocols of the component.

The customization of a default initialization procedure to take advantage of the known operating aspects of a connected component can be analyzed and optimized by a customization circuit 218 of the initialization module 162. It is contemplated that the setup circuit 216 operates in concert with the customization circuit 218 to generate and maintain initialization strategies that leverage the current capabilities and performance of the distributed data storage system to incorporate a newly connected component without degrading the performance, latency, reliability, or security of the system.

While not required or limiting, the customization circuit 218 can take predicted activity and performance from the prediction circuit 214 to ensure that proactively prescribed alterations to a default initialization procedure are optimal to the manufacturing origin of the component as well as the current, and predicted, capabilities of the system. That is, the customization circuit 218 can operate continuously, routinely, or sporadically to evaluate and ensure customizations of an initialization strategy can be conducted with maximum efficiency and minimal degradation of system resources, such as processing, buffer, memory, or table capabilities. As a result, the customization circuit 218 ensures that execution of the initialization strategy in response to a detected manufacturing origin optimizes component initialization without degrading system performance, such as average latency, error rate, or overall time to satisfy a host-generated request.

When the initialization module 162 determines that a newly connected component has a known manufacturing origin corresponding with known, trusted operating parameters and performance, the initialization strategy can prescribe transitioning initialization to passive execution. Although not limiting, passive initialization can be characterized as being conducted during, or after, satisfying host-generated data access requests. A passive circuit 220 of the initialization module 162 can act to optimize the passive execution of initialization steps and/or operations prescribed by the initialization strategy.

It is contemplated that the passive circuit 220 evaluates how initialization steps/operations are passively completed and makes any alterations proactively, or in real-time, to maintain, or improve, performance of the satisfaction of host-generated data access requests. For example, the passive circuit 220 can determine if initialization steps/operations prescribed by an existing strategy can be performed concurrently or sequentially with host-generated data access requests. Embodiments of the passive circuit 220 can set operational thresholds, such as error rate, available processing capabilities, pending background operations to the component, and/or queued request volume, that dictate when initialization steps/operations are to be executed.

Operation of the passive circuit 220 can, in some embodiments, reorder pending initialization steps/operations in response to current, or predicted, system and/or component capabilities. As a non-limiting example, the passive circuit 220 can identify a queue of pending data access requests is becoming full and delays executing scheduled initialization steps concurrently with data access requests so that the queued requests can be prioritized. Continuing on with that example, the passive circuit 220 can change when pending initialization steps are conducted in response to changing system conditions, such as executing one initialization step for every three host-generated data access requests. The dynamic capabilities of the passive circuit 220, as well as the initialization module 162 as a whole, allows for optimal component initialization that corresponds with minimal system resource drain, request satisfaction availability, and/or system performance degradation.

Through the assorted circuitry of the initialization module 162 an initialization strategy can be generated, updated, and executed to increase performance, reliability, and/or consistency of a distributed data storage system. The identification of the manufacturing origin of newly connected hardware can inform the initialization strategy of how to most efficiently incorporate the hardware into the system. The intelligent customization of hardware initialization optimizes system performance, security, and reliability while operational triggers identify when further alterations can adapt to changing system conditions to ensure performance, security, and reliability over time associated with initializing hardware from a state that cannot service host-generated requests to a state that can service such requests.

Figure 9:
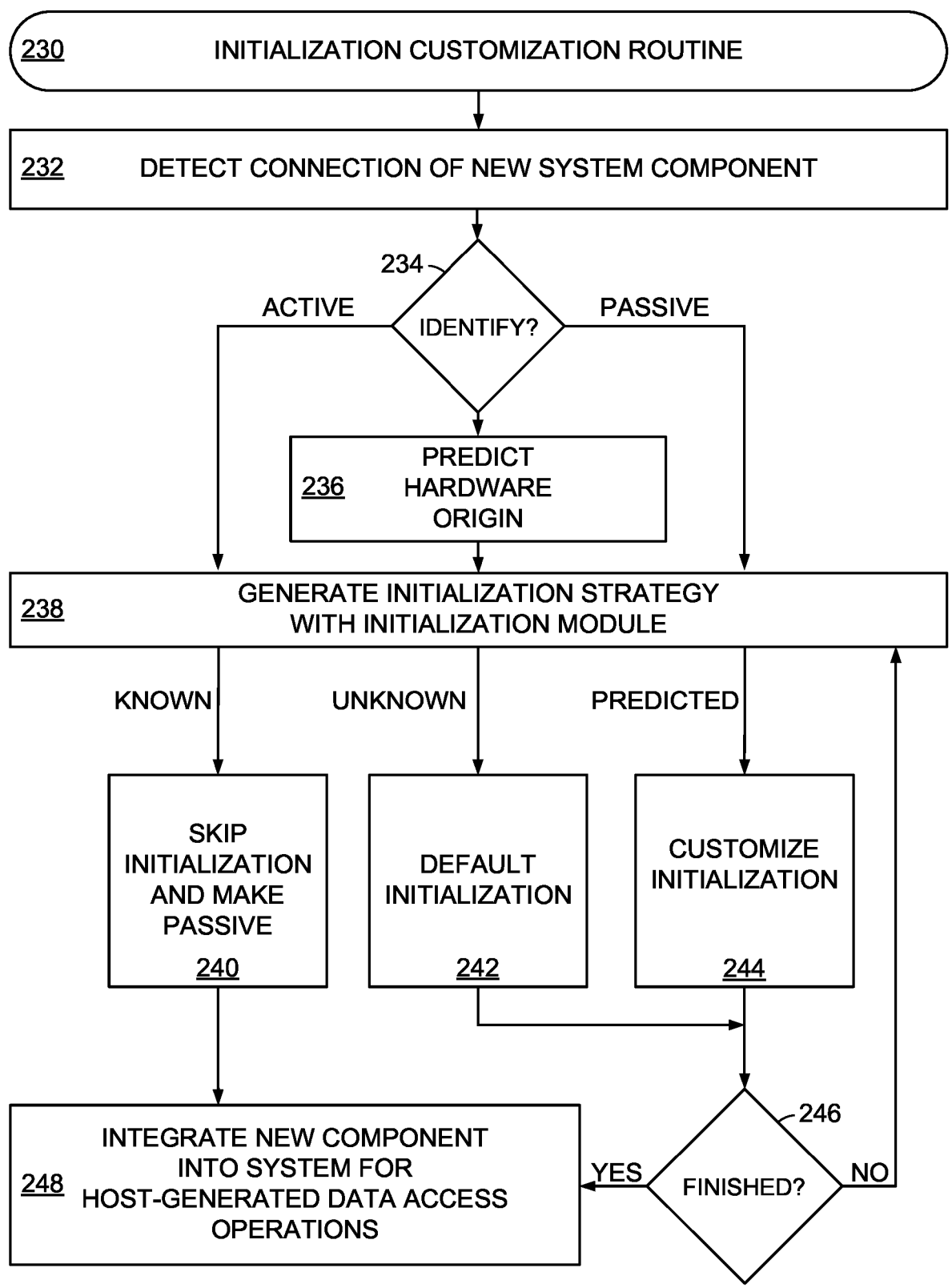
FIG. 9 is a flowchart of an example initialization customization routine the can be executed with the respective aspects of FIGS. 1-8 in accordance with assorted embodiments.

FIG. 9 is a flowchart of an example initialization customization routine 230 that can be carried out with assorted embodiments of the distributed data storage systems in FIGS. 1-8. Upon connection of various hosts to data storage devices via an initialization module, step 232 detects at least one hardware aspect that has an unidentified origin. The initialization module proceeds, in decision 234, to determine if, how, and when, hardware is to be identified. For instance, decision 234 can evaluate if active testing of hardware or if passive activity monitoring for hardware manufacturing origin identification provides desired system performance, reliability, and security. That is, decision 234 can compare the real-time capabilities of the system with the requirements of active and passive hardware manufacturing origin identification to determine when and how hardware origin can be determined without degrading system averages.

Alternatively, decision 234 can determine that system resources cannot maintain desired levels over time by conducting either passive or active hardware manufacturing origin evaluation. As such, decision 234 prompts step 236 to predict the manufacturing origin of hardware with the initialization module based on logged and/or model system information. The detection, or prediction, of the manufacturing origin of hardware allows the initialization module to generate an initialization strategy in step 238 that seeks to incorporate the newly connected hardware into the system in a manner optimized for system consistency, reliability, security, and/or performance.

At any time after connection of the new system component, the initialization module can begin executing one or more initialization strategies. In response to a detection of a known manufacturing origin for the newly connected component, step 240 utilizes the known capabilities, operating parameters, and installed protocols, as directed by an initialization strategy to customize a default initialization procedure and make the initialization passive. That is, step 240 makes initialization steps that would otherwise be performed to bring the component into compliance with the operating parameters, protocol, and security of the rest of the distributed data storage system passive, which may involve the initialization module reordering, altering, or skipping altogether one or more steps/operations of a default initialization procedure. The passive status of the initialization procedure, regardless if the procedure has been customized, corresponds with the newly connected component being capable of immediately servicing host-generated data access requests by employing preexisting, manufacturer installed, capabilities, parameters, and protocol.

An unknown manufacturing origin for the newly connected component prompts the initialization module to execute a preexisting default initialization procedure in step 242. It is contemplated, but not required, that step 242 alters, reorders, or skips one or more steps/operations in response to detected, or predicted, capabilities and/or parameters of the initialized component. Customization of a default initialization procedure can also be conducted in step 244 in response to a predicted manufacturing origin for the newly connected component. It is noted that customization in step 242 can be conducted without regard for the manufacturing origin of the component while customization of step 244 is conducted in response to known operating capabilities and parameters of the component.

The execution of a default initialization procedure, customized or not, is evaluated in decision 246 to determine if the component is ready and capable of satisfying host-generated data access requests. If so, the initialization module can skip remaining procedure steps or make such steps passively executed by the component itself, which allows step 248 to integrate the new component into the system for satisfaction of host-generated data access operations, such as reads, writes, moves, mapping, and recovery.

In the event that the newly connected component is not ready for host-generated operations, such as if an error or unexpected condition arises, decision 246 returns to step 238 where an initialization strategy is reassigned and the evaluation of hardware manufacturing origin can be reevaluated. For instance, decision 246 can determine that the identification of manufacturing origin was incorrect, as was a first initialization procedure, and returns routine 230 to step 238 where further manufacturing origin evaluation can be determined so that an initialization procedure, customized or not, can be conducted.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising:
    connecting a host to a first device and an initialization module;
    performing, with the initialization module, a default initialization procedure on the first device in response to detecting the first device has an unknown manufacturing origin, the default initialization procedure allowing the first device to service data access requests from the host;
    connecting a second device to the host and initialization module;
    identifying a manufacturing origin of the second device with the initialization module;
    customizing the default initialization procedure to a custom procedure with the initialization module;
    executing the custom procedure to allow the second device to satisfy a background operation prescribed by the initialization module.

2. The method of claim 1, wherein the manufacturing origin of the second device is identified passively by the initialization module while the second device completes a host-generated data access request.

3. The method of claim 1, wherein the manufacturing origin is identified by polling the device and receiving a predetermined manufacturing origin identifier.

4. The method of claim 1, wherein the initialization module generates a pattern of test commands to identify the manufacturing origin of the first device.

5. The method of claim 1, wherein the manufacturing origin of the device is a fabricator of hardware of the second device prior to release to an end user.

6. The method of claim 1, wherein the default initialization procedure is has a greater number of steps than the custom procedure.

7. The method of claim 1, wherein the custom procedure exists in an initialization strategy generated by the initialization module prior to connection of the second device.

8. The method of claim 7, wherein the initialization strategy comprises numerous different default initialization procedure customizations based on different detected manufacturing origins.

9. The method of claim 1, wherein the custom procedure has at least one different step than the default initialization procedure, the at least one different step corresponding to the second device identified as a different type of component than the first device.

10. The method of claim 9, wherein the first device is identified as a server and the second device is identified as a data storage device.

11. The method of claim 1, wherein the custom procedure skips at least one step of the default initialization procedure.

12. The method of claim 1, wherein the custom procedure comprises at least one step altered from the default initialization procedure based on the identified manufacturing origin of the second device.

13. A method comprising:
    connecting a host to a first device and an initialization module;
    performing, with the initialization module, a default initialization procedure on the first device in response to detecting the first device has an unknown manufacturing origin, the default initialization procedure allowing the first device to service data access requests from the host;
    connecting a second device to the host and initialization module;
    identifying a manufacturing origin of the second device with the initialization module;
    transitioning the default initialization procedure to a passive procedure with the initialization module;
    satisfying a first host-generated data access request with the second device prior to completing the passive procedure.

14. The method of claim 13, wherein the passive procedure is transitioned for execution from an upstream server to a controller of the second device.

15. The method of claim 13, wherein the passive procedure is executed concurrently with a second host-generated data access request.

16. The method of claim 13, wherein the passive procedure delays executing background operations on memory of the second device until after a queue of host-generated data access requests is satisfied.

17. The method of claim 13, wherein the passive procedure is continuously conducted while the initialization module detects a predetermined amount of processing capability in the second device.

18. The method of claim 13, wherein the passive procedure skips at least one step of the default initialization procedure in response to the initialization module identifying a step of the default initialization procedure being redundant to a manufacturer installed operating parameter of the second device.

19. The method of claim 18, wherein the redundant step of the default initialization procedure is installing an encryption scheme.

20. The method of claim 18, wherein the redundant step of the default initialization procedure is installing a redundant array of independent disks protocol.

* * * * *